(12) United States Patent
Yoneda

(10) Patent No.: US 11,396,092 B2
(45) Date of Patent: Jul. 26, 2022

(54) ELECTRIC POWER TOOL PROVIDED WITH MOTOR CONTROLLER CONTROLLING MOTOR INCLUDING LIMITER FOR LIMITTING CURRENT CONTRIBUTING TO TORQUE GENERATION

(71) Applicant: Panasonic Intellectual Property Management Co., Ltd., Osaka (JP)

(72) Inventor: Fumiiki Yoneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 344 days.

(21) Appl. No.: 16/618,841

(22) PCT Filed: Apr. 17, 2018

(86) PCT No.: PCT/JP2018/015809
§ 371 (c)(1),
(2) Date: Dec. 3, 2019

(87) PCT Pub. No.: WO2018/230140
PCT Pub. Date: Dec. 20, 2018

(65) Prior Publication Data
US 2021/0078145 A1    Mar. 18, 2021

(30) Foreign Application Priority Data
Jun. 16, 2017   (JP) .............................. JP2017-118961

(51) Int. Cl.
*H02P 7/00* (2016.01)
*B25B 23/147* (2006.01)
*H02P 29/40* (2016.01)

(52) U.S. Cl.
CPC ............ *B25B 23/147* (2013.01); *H02P 29/40* (2016.02)

(58) Field of Classification Search
CPC ........ H02P 29/40; H02P 21/20; H02P 29/027; H02P 29/032; B25B 23/14
See application file for complete search history.

(56) References Cited

U.S. PATENT DOCUMENTS

| 4,210,852 A | 7/1980 | Gustavson |
|---|---|---|
| 2007/0046249 A1 | 3/2007 | Tomigashi |

(Continued)

FOREIGN PATENT DOCUMENTS

| CN | 104885357 A | 9/2015 |
|---|---|---|
| CN | 105262394 A | 1/2016 |

(Continued)

OTHER PUBLICATIONS

International Search Report for corresponding Application No. PCT/JP2018/015809, dated Jun. 26, 2018.

(Continued)

*Primary Examiner* — Karen Masih
(74) *Attorney, Agent, or Firm* — Renner, Otto, Boisselle & Sklar, LLP

(57) ABSTRACT

An electric power tool is provided with a permanent magnet synchronous motor, and a controller. The controller is configured to control an operation of the permanent magnet synchronous motor. The controller includes a limiter that limits a current contributing to torque generation by the permanent magnet synchronous motor to a predetermined maximum set value based on a predetermined tightening torque. The controller calculates the maximum set value of the current that contributes to the torque generation by changing one of a rotation speed and an angular speed of the permanent magnet synchronous motor.

3 Claims, 3 Drawing Sheets

(56) References Cited

U.S. PATENT DOCUMENTS

| | | | |
|---|---|---|---|
| 2007/0182350 | A1 | 8/2007 | Patterson et al. |
| 2007/0236167 | A1 | 10/2007 | Tomigashi |
| 2010/0065293 | A1 | 3/2010 | Lohr |
| 2011/0000688 | A1 | 1/2011 | Iwata |
| 2013/0049643 | A1 | 2/2013 | Kusakawa |
| 2013/0264087 | A1 | 10/2013 | Harada |
| 2015/0137721 | A1 | 5/2015 | Yamamoto |

FOREIGN PATENT DOCUMENTS

| | | | | |
|---|---|---|---|---|
| CN | 105450123 | A | 3/2016 | |
| DE | 102008040096 | A1 | 1/2010 | |
| EP | 1008423 | A2 | 6/2000 | |
| EP | 1447177 | A2 * | 8/2004 | ......... B25B 23/1453 |
| JP | S52-064098 | A | 5/1977 | |
| JP | S58-090474 | A | 5/1983 | |
| JP | H03-026431 | A | 2/1991 | |
| JP | H05-104454 | A | 4/1993 | |
| JP | H10-080872 | A | 3/1998 | |
| JP | H10-328952 | A | 12/1998 | |
| JP | 2004-180459 | A | 6/2004 | |
| JP | 2005-176458 | A | 6/2005 | |
| JP | 3663638 | B2 | 6/2005 | |
| JP | 2007-526734 | A | 9/2007 | |
| JP | 4198162 | B2 | 12/2008 | |
| JP | 4480696 | B2 | 6/2010 | |
| JP | 2012-139767 | A | 7/2012 | |
| JP | 2013-049120 | A | 3/2013 | |
| JP | 5182562 | B2 | 4/2013 | |
| JP | 2015-100858 | A | 6/2015 | |
| JP | 2015-199431 | A | 11/2015 | |
| WO | 2005/086341 | A1 | 9/2005 | |
| WO | 2014/051167 | A2 | 4/2014 | |

OTHER PUBLICATIONS

International Preliminary Report on Patentability for corresponding Application No. PCT/JP2018/015809, dated Dec. 26, 2019.

Extended European Search Reort for corresponding European Patent Application No. 18816964.3 dated Jun. 26, 2020.

Notification of Reasons for Refusal and Search Report for the Chinese patent application No. 201880039522.9, dated Oct. 9, 2020.

Notification of Reasons for Refusal for the Japanese patent application No. 2019-525154, dated Nov. 4, 2020.

* cited by examiner

ELECTRIC POWER TOOL PROVIDED WITH MOTOR CONTROLLER CONTROLLING MOTOR INCLUDING LIMITER FOR LIMITTING CURRENT CONTRIBUTING TO TORQUE GENERATION

TECHNICAL FIELD

The present disclosure relates to an electric power tool, which includes a motor controller for controlling a motor, for example.

BACKGROUND ART

In general, an electric power tool such as a drill driver sets a torque using a mechanical clutch mechanism. However, electronization of torque setting has been attempted in recent years. For example, Patent Document 1 proposes an electric power tool characterized by calculating a tightening torque from a motor driving current or a motor rotation speed, and stopping a motor when the tightening torque becomes a preset value or larger.

In addition, for example, Patent Document 2 discloses an electric driver control apparatus, which detects a screw tightening torque of an electric driver, and intermittently supplies a drive torque to a chuck until completion of tightening is detected based on the detected torque.

PRIOR ART DOCUMENTS

Patent Literature

[Patent Document 1] Japanese patent publication No. 5182562

[Patent Document 2] Japanese patent publication No. 3663638

[Patent Document 3] Japanese patent publication No. 4480696

[Patent Document 4] Japanese patent publication No. 4198162

SUMMARY OF THE INVENTION

Technical Problems

However, problems including the following arise from a method of Patent Document 1 identified above:

(1) a motor driving current includes a motor excitation current not contributing to a rotational torque; and (2) factors such as inertial energy of a rotating body are not considered.

In this case, it is difficult to set an accurate tightening torque.

An object of the present disclosure is to solve the aforementioned problems, and to provide an electric power tool capable of eliminating or simplifying a mechanical clutch mechanism by achieving a more accurate tightening torque setting only by motor control.

Means for Solving the Problems

According to one aspect of the present disclosure, there is provided an electric power tool including a permanent magnet synchronous motor, and a controller. The controller is configured to control an operation of the permanent magnet synchronous motor. The controller includes a limiter that limits a current contributing to torque generation by the permanent magnet synchronous motor to a predetermined maximum set value based on a predetermined tightening torque.

Effect of the Invention

The generated torque from the motor can be controlled based on only the current that contributes to torque generation by using the means described above. In addition, a current value contributing to the generated torque can be dynamically limited to a maximum value, which also considers effects of inertia energy of a rotating body and the like.

Accordingly, the electric power tool of the present disclosure is capable of achieving more accurate tightening torque setting only by motor control, and therefore, is capable of eliminating or simplifying a mechanical clutch mechanism.

MODE FOR CARRYING OUT THE INVENTION

Embodiments according to the present disclosure will be hereinafter specifically described with reference to the drawings. In each of the drawings to be referred to, identical reference numbers are given to identical parts, and description of the identical parts is not repeated in principle. In addition, in each of the drawings to be referred to, matters given identical symbols (for example, θ, ω) are identical matters. In addition, a state quantity and the like may be represented only by symbols for simplifying the description. More specifically, an "estimated motor speed $\omega_e$" may be simply referred to as a "$\omega_e$", for example, but both the cases refer to an identical matter.

Figure 1:
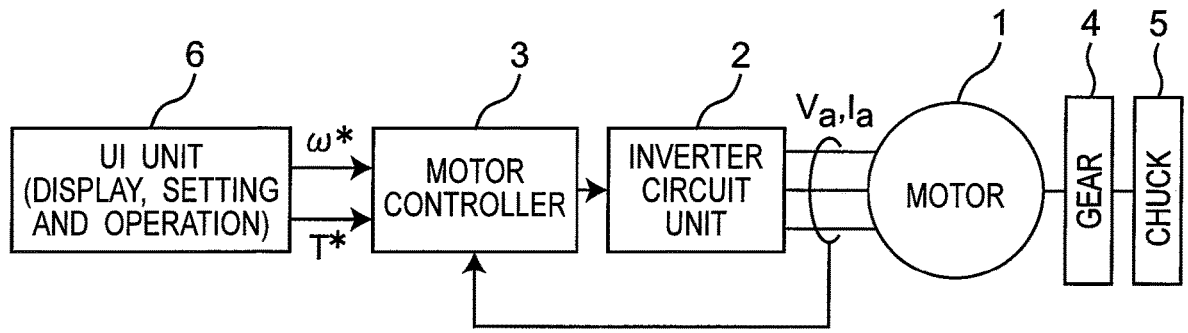
FIG. 1 is a block diagram showing a configuration example of an electric power tool according to a first embodiment of the present disclosure.

FIG. 1 is a block diagram showing a configuration example of an electric power tool according to a first embodiment of the present disclosure. The electric power tool according to the first embodiment of FIG. 1 is an electric driver, for example, and the electric power tool includes a motor 1, an inverter circuit unit 2, a motor controller 3, a gear 4, a chuck 5, and a user interface unit (UI unit) 6.

The motor 1 of FIG. 1 is configured to include a three-phase permanent magnet synchronous motor, which includes a permanent magnet on a rotor (not shown), and an armature winding on a stator (not shown), for example. It is assumed that the terms of the armature winding and the rotor in the following description are abbreviations of the armature winding provided on the stator of the motor 1 and the rotor of the motor 1, respectively. The motor 1 is a salient pole machine (motor having saliency) represented by an interior permanent magnet synchronous motor (IPMSM), for example, but may be a non-salient pole machine. The motor 1 herein is rotatably connected, via a gear 4, for example, to the chuck 5 to which a screw rotating bit is attached.

The inverter circuit unit 2 supplies a three-phase AC voltage, including a U phase, a V phase, and a W phase, to the armature winding of the motor 1 in accordance with a rotor position of the motor 1. It is assumed that a voltage supplied to the armature winding of the motor 1 is a motor voltage (armature voltage) $V_a$, and a current supplied to the armature winding of the motor 1 from the inverter circuit unit 2 is a motor current (armature current) $I_a$.

For example, the motor controller 3 has a position sensorless control function, which estimates a rotor position, a rotation speed and the like of the motor 1 based on the motor current $I_a$, and outputs a signal for operating the motor 1 at a desired rotation speed and with a target tightening torque to the inverter circuit unit 2. It is to be noted that the desired rotation speed and the target tightening torque are preset by the user interface unit 6, and is outputted to the motor controller 3 as a motor speed command value ω* and a target tightening torque T*, respectively, in conjunction with a trigger switch (not shown) operated by a user.

Figure 2:
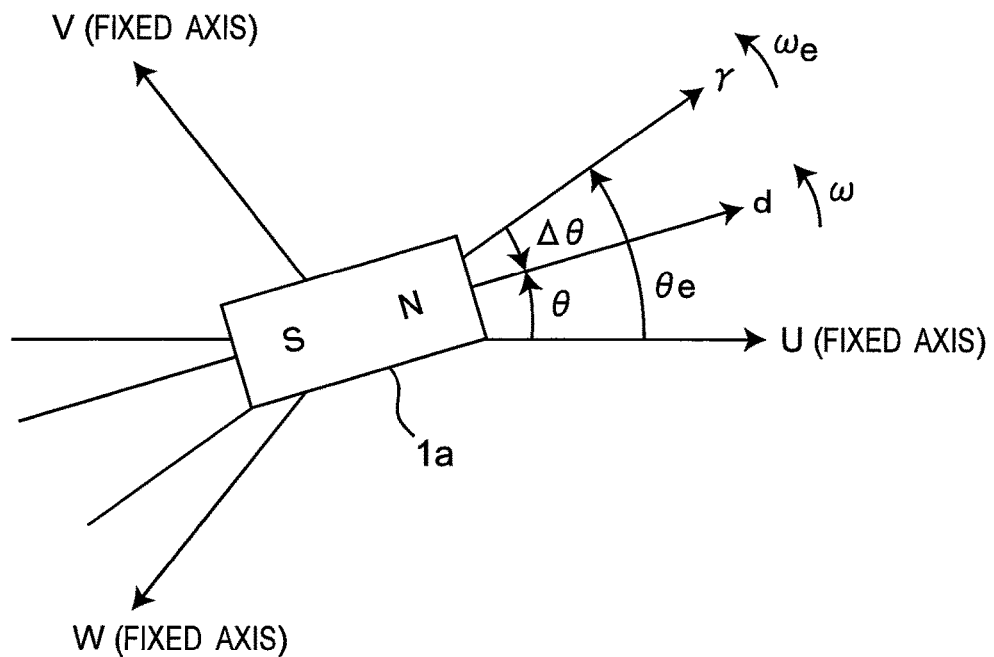
FIG. 2 is an analysis model diagram of a motor 1 included in the electric power tool of FIG. 1.

FIG. 2 is an analysis model diagram of the motor 1 included in the electric power tool of FIG. 1. FIG. 2 shows U-phase, V-phase, and W-phase armature winding fixed axes. In a rotation coordinate system, which rotates at a speed identical to a speed of a magnetic flux generated by a permanent magnet 1a configuring the rotor of the motor 1, it is assumed that a d-axis represents a direction of a magnetic flux generated by the permanent magnet 1a, and that a γ-axis represents an estimation axis under control in correspondence with the d axis. While not shown in the figure, a q-axis is defined in a phase advanced by an electrical angle of 90 degrees from the d-axis, and a δ-axis of an estimation axis is defined in a phase advanced by an electrical angle of 90 degrees from the γ-axis. Coordinate axes of the rotation coordinate system, which designates the d-axis and the q-axis of coordinate axes are referred to as d-q axes (real axes). The rotation coordinate system under control (estimation rotation coordinate system) is a coordinate system, which designates the γ-axis and the δ-axis as coordinate axes. These coordinate axes are referred to as γ-δ axes.

The d-q axes rotate, and the rotation speed of the d-q axes (i.e., rotation speed of the rotor of the motor 1) is referred to as an actual motor speed ω. The γ-δ axes are also rotating. The rotation speed of the γ-δ axes is referred to as an estimated motor speed $ω_e$. In addition, in the d-q axes rotating at a certain moment, a phase of the d-axis is represented by θ (actual rotor position θ) with reference to the U-phase armature winding fixed axis. Similarly, in the γ-δ axes rotating at a certain moment, a phase of the γ-axis is represented by $θ_e$ (estimated rotor position $θ_e$) with reference to the U-phase armature winding fixed axis. In this case, an axis error Δθ between the d-axis and the γ-axis (axis error Δθ between the d-q axes and the γ-δ axes) is expressed as $Δθ=θ−θ_e$. In addition, each of the parameters ω*, ω, and $ω_e$ is represented by an electrical angular speed.

In the following description, a γ-axis component, a δ-axis component, a d-axis component, and a q-axis component of the motor voltage $V_a$ are represented by a γ-axis voltage $v_γ$, a δ-axis voltage $v_δ$, a d-axis voltage $v_d$, and a q-axis voltage $v_q$, respectively. A γ-axis component, a δ-axis component, a d-axis component, and a q-axis component of the motor current $I_a$ are represented by a γ-axis current $i_γ$, a δ-axis current $i_δ$, a d-axis current $i_d$, and a q-axis current $i_q$, respectively.

In addition, $R_a$ is a motor resistor (resistance value of the armature winding of the motor 1), $L_d$ and $L_q$ are d-axis inductance (d-axis component of inductance of the armature winding of the motor 1), and q-axis inductance (q-axis component of inductance of the armature winding of the motor 1), and $Φ_a$ is an armature interlinkage magnetic flux generated by the permanent magnet 1a. It is noted that the values $L_d$, $L_q$, $R_a$, and $Φ_a$ are values determined during manufacture of a motor drive system for the electric power tool. These values are used during calculation by the motor controller 3.

Figure 3:
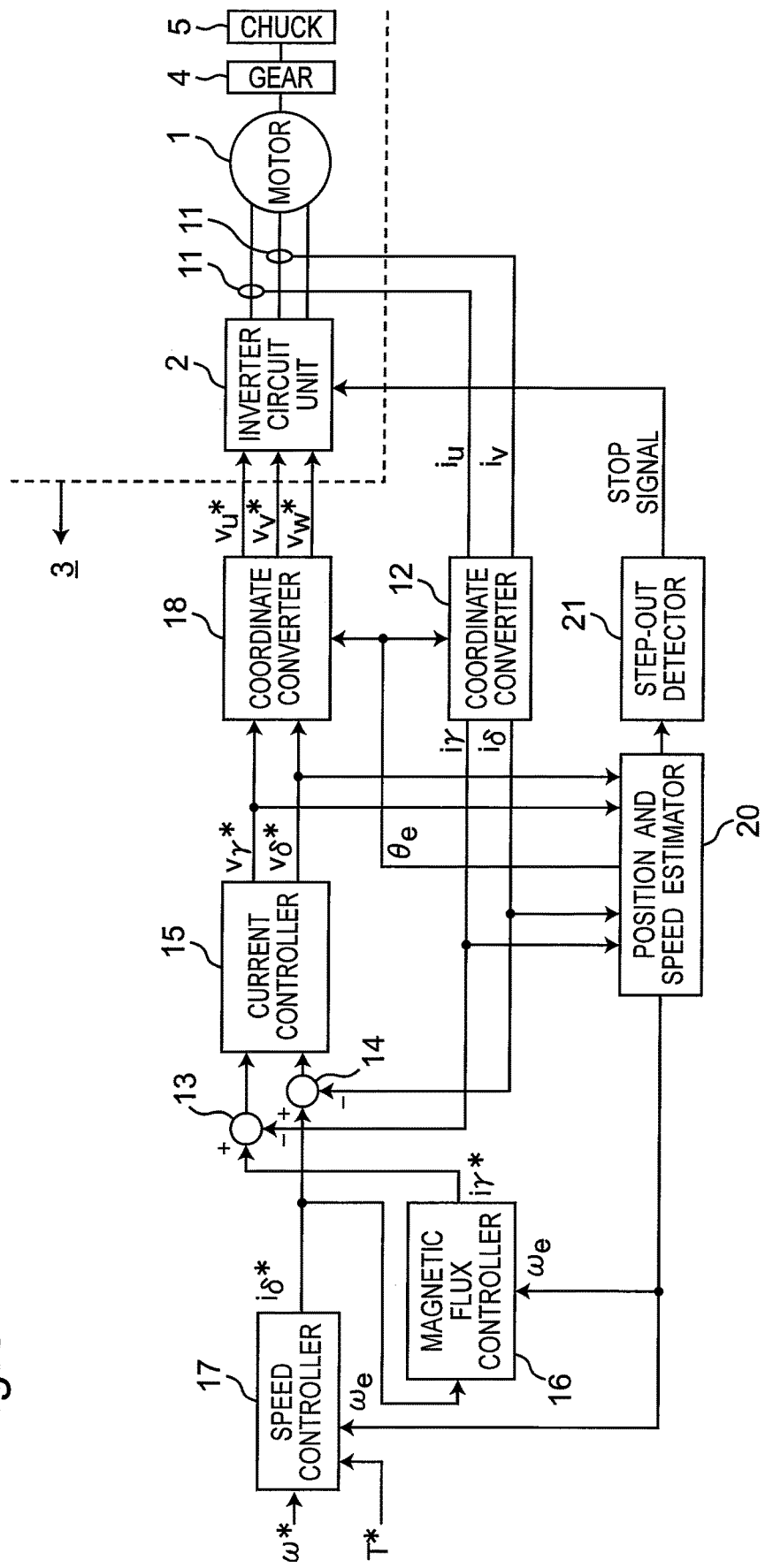
FIG. 3 is a block diagram showing a detailed configuration example of the electric power tool of FIG. 1.

FIG. 3 is a block diagram showing a detailed configuration example of the electric power tool of FIG. 1. Referring to FIG. 3, the motor controller 3 includes current detectors 11, a coordinate transformer 12, a subtractor 13, a subtractor 14, a current controller 15, a magnetic flux controller 16, a speed controller 17, a coordinate transformer 18, a position and speed estimator 20, and a step-out detector 21.

The current detectors 11 are each composed of a Hall element, for example, and detect a U-phase current $i_u$ (current flowing in the U-phase armature winding), and a V-phase current $i_v$ (current flowing in the V-phase armature winding) of the motor current $I_a$ supplied from the inverter circuit unit 2 to the motor 1. It is noted that these currents may be detected by various existing current detection systems each incorporating a shunt resistor or the like in the inverter circuit unit 2. The coordinate transformer 12 receives detection results of the U-phase current $i_u$ and V-phase current $i_v$ from the current detector 11, and transforms the detection results into a γ-axis current $i_γ$ (current controlling the magnetic flux of the motor) and a δ-axis current is (current directly proportional to supplied torque of the motor and directly contributing to generation of rotation torque of the motor) using the following Equation (1) based on the estimated rotor position $θ_e$ received from the position and speed estimator 20.

[Equation 1]

$$\begin{bmatrix} i_γ \\ i_δ \end{bmatrix} = \sqrt{2} \begin{bmatrix} \sin(θ_e + π/3) & \sinθ_e \\ \cos(θ_e + π/3) & \cosθ_e \end{bmatrix} \begin{bmatrix} i_u \\ i_v \end{bmatrix} \quad (1)$$

The position and speed estimator 20 estimates and outputs the estimated rotor position $θ_e$ and the estimated motor speed $ω_e$. The estimated rotor position $θ_e$ and the estimated motor speed $ω_e$ may be estimated using a method disclosed in Patent Document 3, for example.

The speed controller 17 subtracts the estimated motor speed $ω_e$ given by the position and speed estimator 20 from the motor speed command value ω* given by the user interface unit 6, and inputs a subtraction result (ω*−$ω_e$) to a Proportional Integral (PI) controller 51 (FIG. 4), for example, to generate a δ-axis current command value $i_δ$*. The δ-axis current command value $i_δ$* represents a current value, which is to be followed by the δ-axis current is as the δ-axis component of the motor current $I_a$. The magnetic flux controller 16 outputs a γ-axis current command value $i_γ$*. In this case, the δ-axis current command value $i_δ$* and the estimated motor speed $ω_e$ are referred to as necessary. The γ-axis current command value $i_γ$* represents a current value, which is to be followed by the γ-axis current $i_γ$ as the γ-axis component of the motor current $I_a$.

The subtractor 13 subtracts the γ-axis current $i_γ$ outputted by the coordinate transformer 12 from the γ-axis current command value $i_γ$* outputted by the magnetic flux controller 16 to calculate a current error $(i_\gamma^* - i_\gamma)$ as a subtraction result. The subtractor 14 subtracts the δ-axis current is outputted by the coordinate transformer 12 from the δ-axis current command value $i_\delta^*$ outputted by the speed controller 17 to calculate a current error $(i_\delta^* - i_\delta)$ as a subtraction result.

The current controller 15 receives the respective current errors calculated by the subtractors 13 and 14, and calculates and outputs the γ-axis voltage command value $v_\gamma^*$ and the δ-axis voltage command value $v_\delta^*$ such that the γ-axis current $i_\gamma$ follows the γ-axis current command value $i_\gamma^*$, and that the δ-axis current $i_\delta$ follows the δ-axis current command value $i_\delta^*$.

The coordinate transformer 18 performs inverse transformation of the γ-axis voltage command value $v_\gamma^*$ and the δ-axis voltage command value $v_\delta^*$ based on the estimated rotor position $\theta_e$ given from the position and speed estimator 20, generates a three-phase voltage command value consisting of a U-phase voltage command value $v_u^*$, a V-phase voltage command value $v_v^*$ and a W-phase voltage command value $v_w^*$ representing the U-phase component, V-phase component, and W-phase component of the motor voltage $V_a$, and outputs the generated three-phase command value to the inverter circuit unit 2. The following Equation (2) is used for this inverse transformation.

[Equation 2]

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* \\ v_\delta^* \end{bmatrix} \quad (2)$$

$$v_w^* = -(v_u^* + v_v^*)$$

The inverter circuit unit 2 generates a signal having a pulse width modulated based on the three-phase voltage command value $(v_u^*, v_v^*, \text{and } v_w^*)$ representing a voltage to be applied to the motor 1, and supplies the motor current $I_a$ corresponding to the three-phase voltage command value $(v_u^*, v_v^*, \text{and } v_w^*)$ to the armature winding of the motor 1 to drive the motor 1.

The step-out detector 21 estimates a rotation speed of the rotor using an estimation system different from the estimation system of the rotation speed of the rotor adopted by the position and speed estimator 20 (for example, see Patent Document 4). When a large difference is recognized, the motor 1 is forcibly stopped on an assumption of step out.

Figure 4:
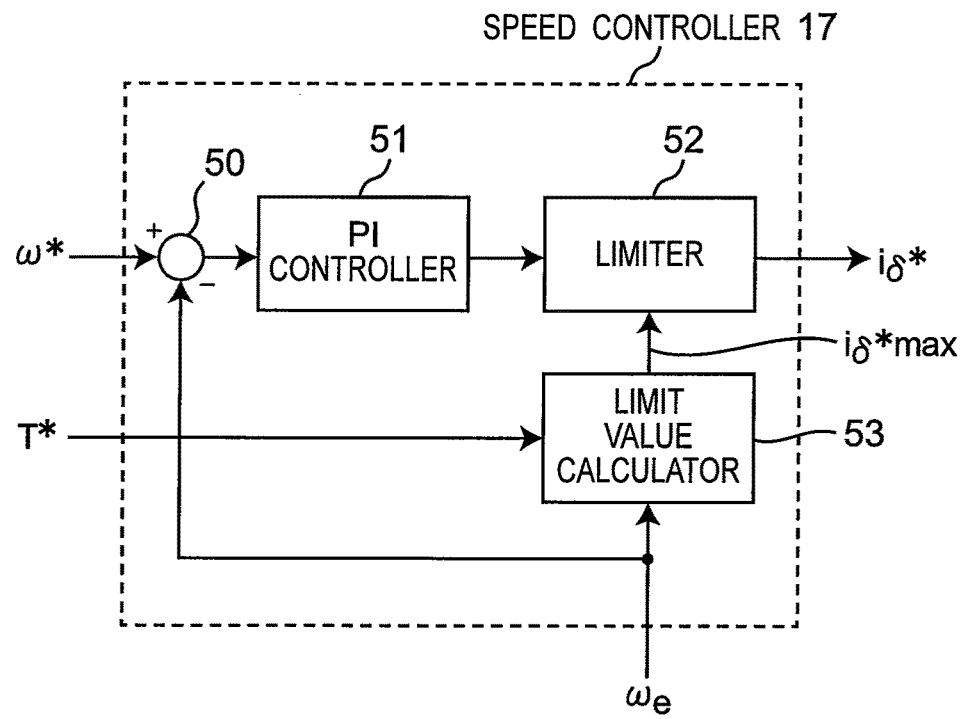
FIG. 4 is a block diagram showing a detailed configuration example of a speed controller 17 of FIG. 3.

FIG. 4 is a block diagram showing a detailed configuration example of the speed controller 17 of FIG. 3. Referring to FIG. 4, an output from the PI controller 51 generates a δ-axis current command value $i_\delta^*$ before current limitation based on the subtraction result $(\omega^* - \omega_e)$ of the subtractor 50, and outputs the δ-axis current command value $i_\delta^*$ to a limiter 52. The limiter 52 outputs the output of the PI controller 51 without change when the output of the PI controller 51 is equal to or smaller than a maximum set value $i_\delta^*_{max}$ of the limiter 52. On the other hand, when the output of the PI controller 51 exceeds the maximum set value $i_\delta^*_{max}$ of the limiter 52, a value of $i_\delta^*$ limited to $i_\delta^*_{max}$ is outputted. A limit value calculation unit 53 calculates the maximum set value $i_\delta^*_{max}$ of the limiter 52 using the following Equation (3), and sequentially updates the maximum set value $i_\delta^*_{max}$ of the limiter 52.

[Equation 3]

$$i_\delta^*_{max} = K(T - J \cdot d\omega)/dt + T0) \quad (3)$$

In this equation, K and J are constants, $d\omega/dt$ is a differential value of an angular speed of the motor, and T is a predetermined target tightening torque. In addition, T0 as a predetermined loss torque may be set in a form of a table or the like in an internal memory of the limit value calculation unit 53 in advance as a dependent variable of the angular speed ω of the motor, for example. It is noted that the estimated motor speed $\omega_e$ may be used as a substitute for the angular speed ca of the motor.

As described above, the δ-axis current is a current directly proportional to a supplied torque of the motor, and does not include an excitation current or the like, which does not directly contribute to generation of a rotational torque of the motor. In addition, the command value $i_\delta^*$ of the δ-axis current is dynamically limited using the Equation (3) described above. Accordingly, more accurate tightening torque control considering inertia energy of the rotating body or the like is achievable.

Figure 5:
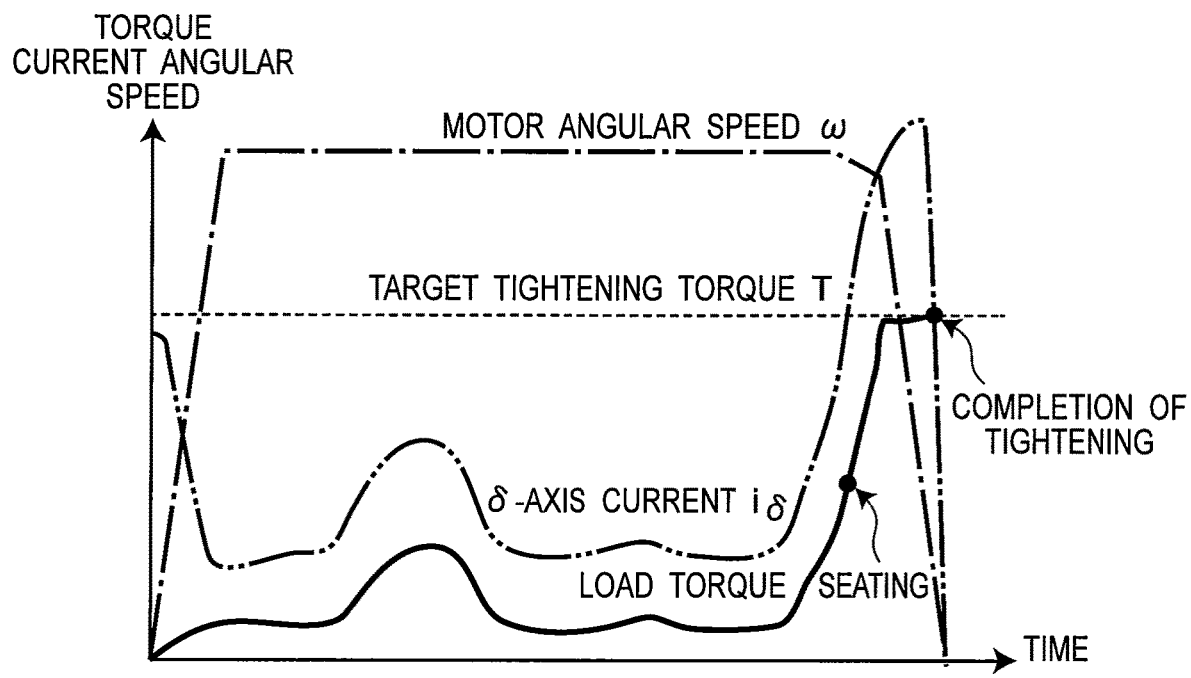
FIG. 5 is a time chart showing an operation example during screw tightening by the electric power tool of FIG. 1.

In other words, when a screw which is a work target of the electric power tool is seated, a load torque rapidly increases. In this case, the δ-axis current increases with the increase in the load torque. The δ-axis current is eventually limited by the maximum set value of the Equation (3). At this time, the rotation speed of the motor also decreases, and inertial energy of the rotating body and a loss torque decrease in accordance with the lowering of the rotational speed of the motor. Accordingly, the maximum set value (current proportional to the supply torque of the motor) of the Equation (3) increases, and finally the δ-axis current becomes constant at $i_\delta^*_{max} = K(T)$. Thereafter, step out of the motor is caused, or the motor rotation speed becomes lower than a specified value (for example, zero) immediately before a stop of the motor. In this case, the motor 1 detects this state and comes to a stop (FIG. 5).

Accordingly, when the motor decelerates and finally stops by a rapid increase in a load torque resulting from seating of the screw as a work target of the electric power tool in the present embodiment, the motor current gradually increases from seating of the rotor to completion of tightening in accordance with the lowering of the motor rotation speed. During this period, tightening with a constant torque is achievable. Therefore, more accurate tightening torque can be set, and a mechanical clutch mechanism can be eliminated or simplified.

The invention claimed is:

1. An electric power tool comprising:
   a permanent magnet synchronous motor; and
   a controller configured to control an operation of the permanent magnet synchronous motor,
   wherein the controller comprises a limiter that limits a current contributing to torque generation by the permanent magnet synchronous motor to a predetermined maximum set value based on a predetermined tightening torque.

2. The electric power tool as claimed in claim 1,
   wherein the controller calculates the maximum set value of the current that contributes to the torque generation by changing one of a rotation speed and an angular speed of the permanent magnet synchronous motor.

3. The electric power tool as claimed in claim 2,
   wherein the controller calculates a maximum set value $i_\delta^*_{max}$ of the current that contributes to the torque generation using an equation of $i_\delta^*_{max} = K(T - J \cdot d\omega)/dt + T0)$ wherein K and J are constants, $d\omega/dt$ is a differential value of the angular speed of the permanent magnet synchronous motor, T is a predetermined target tightening torque, and T0 is a predetermined loss torque.

* * * * *